United States Patent
Saeki et al.

(10) Patent No.: US 10,057,845 B2
(45) Date of Patent: Aug. 21, 2018

(54) CONTROL SYSTEM FOR INFORMATION PROCESSING APPARATUS USING PORTABLE TERMINAL, PORTABLE TERMINAL, AND CONTROL METHOD AND CONTROL PROGRAM FOR INFORMATION PROCESSING APPARATUS

(71) Applicant: STAR MICRONICS CO., LTD., Shizuoka (JP)

(72) Inventors: Takashi Saeki, Shizuoka (JP); Kazumasa Hosozawa, Shizuoka (JP); Yuji Mori, Shizuoka (JP)

(73) Assignee: STAR MICRONICS CO., LTD., Shizuoka-Shi (JP)

( * ) Notice: Subject to any disclaimer, the term of this patent is extended or adjusted under 35 U.S.C. 154(b) by 156 days.

(21) Appl. No.: 15/238,766

(22) Filed: Aug. 17, 2016

(65) Prior Publication Data
US 2016/0360477 A1    Dec. 8, 2016

Related U.S. Application Data

(63) Continuation of application No. PCT/JP2015/052097, filed on Jan. 27, 2015.

(30) Foreign Application Priority Data

Apr. 7, 2014  (JP) ................................. 2014-078307

(51) Int. Cl.
*H04W 48/18*       (2009.01)
*B41J 29/00*       (2006.01)
(Continued)

(52) U.S. Cl.
CPC ............. *H04W 48/18* (2013.01); *B41J 29/00* (2013.01); *B41J 29/38* (2013.01); *G06F 3/1204* (2013.01);
(Continued)

(58) Field of Classification Search
CPC ........... H04B 17/00; H04B 3/46; H04L 43/00; H04L 43/50; H04L 43/0876;
(Continued)

(56) References Cited

U.S. PATENT DOCUMENTS

2005/0276418 A1   12/2005  Hagiwara
2011/0002009 A1*   1/2011  Ohashi ...................... G01S 5/06
                                                                358/1.15

FOREIGN PATENT DOCUMENTS

JP     2006-285906     10/2006
JP     2008-035058      2/2008
(Continued)

OTHER PUBLICATIONS

JPO, Decision of Refusal of Application No. 2014-078307, dated Feb. 13, 2018.
(Continued)

*Primary Examiner* — Dady Chery
(74) *Attorney, Agent, or Firm* — Lex IP Meister, PLLC

(57) ABSTRACT

The present invention enables a processing to be executed by the closest information processing apparatuses selected by a portable terminal without exclusive use of the information processing apparatus by the portable terminal. The control system comprises a distance detecting unit which detects a printer at the shortest distance from a portable POS terminal based on the intensity of radio waves emitted from the plurality of printers and received by the portable POS terminal by using the BLE and a processing execution control unit which instructs the detected printer to execute the processing by using the wireless LAN. Even while the portable POS terminal transmits printing data to the printer by using the wireless LAN, the other portable POS terminals are allowed to use the BLE to receive the radio waves from
(Continued)

the plurality of printers including the particular printer, thereby detecting the closest printer.

10 Claims, 14 Drawing Sheets

(51) Int. Cl.
| | |
|---|---|
| *B41J 29/38* | (2006.01) |
| *G07G 1/12* | (2006.01) |
| *H04B 17/318* | (2015.01) |
| *G06Q 20/20* | (2012.01) |
| *G06F 3/12* | (2006.01) |
| *H04W 84/12* | (2009.01) |
| *H04W 4/80* | (2018.01) |

(52) U.S. Cl.
CPC ............ *G06F 3/126* (2013.01); *G06F 3/1226* (2013.01); *G06F 3/1292* (2013.01); *G06Q 20/209* (2013.01); *G07G 1/12* (2013.01); *H04B 17/318* (2015.01); *H04W 4/80* (2018.02); *H04W 84/12* (2013.01)

(58) Field of Classification Search
CPC ............ H04L 43/0882; H04L 43/0888; H04L 43/0894; H04L 41/04; H04L 41/085; H04L 41/12; H04L 45/02; H04W 24/00; H04W 84/18
USPC .................................................. 370/252, 254
See application file for complete search history.

(56) References Cited

FOREIGN PATENT DOCUMENTS

| | | |
|---|---|---|
| JP | 2010-280199 | 12/2010 |
| JP | 2012-138072 | 7/2012 |
| JP | 2013-246785 | 12/2013 |
| JP | 2014-178732 | 9/2014 |

OTHER PUBLICATIONS

JPO, Notification of Reasons for Refusal of JP2014-78307 dated Sep. 12, 2017.
EPO, Extended European Search Report of EP 15776697.3 dated Sep. 13, 2017.

\* cited by examiner

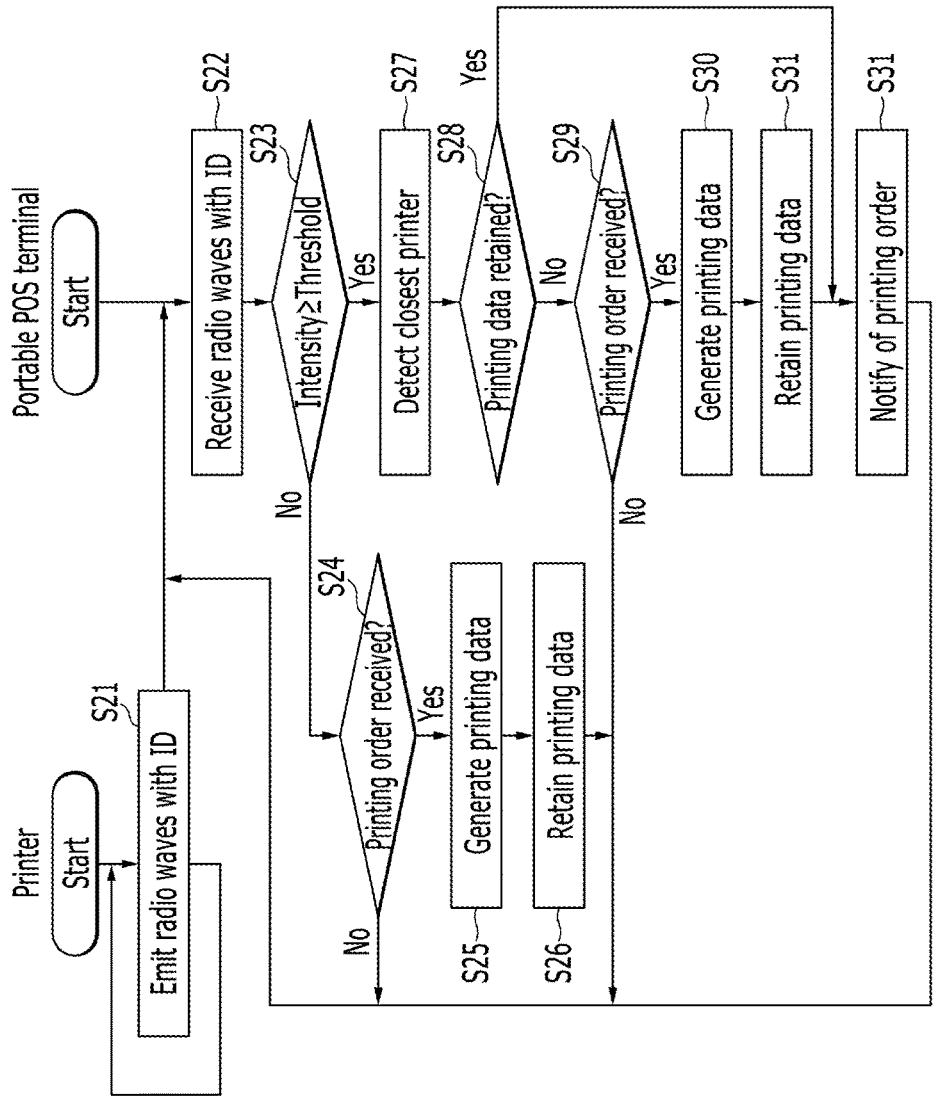

CONTROL SYSTEM FOR INFORMATION PROCESSING APPARATUS USING PORTABLE TERMINAL, PORTABLE TERMINAL, AND CONTROL METHOD AND CONTROL PROGRAM FOR INFORMATION PROCESSING APPARATUS

CROSS-REFERENCE TO RELATED APPLICATION

The present application is a continuation of PCT Application No. PCT/JP2015/052097, filed on Jan. 27, 2015, which claims priority of Japanese Patent Application No. 2014-078307 filed on Apr. 7, 2014. The contents of this application are incorporated herein by reference in their entirety.

BACKGROUND

(a) Field

The present invention relates to a control system for an information processing apparatus using a portable terminal, a portable terminal, and a control method and a control program for an information processing apparatus, especially to a system provided with a plurality of information processing apparatuses capable of wireless communication and a plurality of portable terminals capable of wireless communication and configured to execute a processing by one of the plurality of information processing apparatuses selected by the portable terminal.

(b) Description of the Related Art

A mobile point-of-sale (POS) system using a portable terminal such as a tablet computer and a smart phone is conventionally known. The mobile POS system enables a payment in any place since the portable terminal ("a portable POS terminal") is provided with a POS register function conventionally performed by a dedicated terminal. The mobile POS system is also capable of issuing a receipt when the portable POS terminal is connected to a printer via wireless communication. The mobile POS system is capable of shortening a waiting time at a cash desk in the rush hour, and further capable of conducting a POS business outdoors in an environment where a cash desk is hardly installed.

In a large store, a sales clerk carrying a portable POS terminal often moves across the floors to follow a guest. In the case that a portable POS terminal is connected to a printer on a one-to-one basis, the sales clerk sometimes returns to the floor where the printer is located to get a receipt issued by the printer. It would be a time-consuming trouble for the sales clerk, resulting in deterioration in services for the guest.

To solve the problem, a mobile POS system has been proposed to shorten the waiting time for payment (for example, see Japanese Patent Application Publication No. 2013-246785). In the proposed mobile POS system, the portable POS terminal connected to a store server via a wireless local area network (LAN) is capable of communicating with a plurality of printers using the Bluetooth (Registered Trademark) communication to obtain the intensity of radio waves emitted from each of the printers. The mobile POS terminal is capable of automatically detecting the closest printer according to the obtained intensity of radio waves, showing the result together with, for example, a map on the display. The user selects a printer on the display, and then a printing order is given to the printer.

In the system disclosed in the literature, however, the Bluetooth communication is commonly used to detect the distance from the portable POS terminal to the printer and to transmit print data from the portable POS terminal to the printer. When the Bluetooth communication is established between a certain portable POS terminal and the closest printer for print data transmission, the other portable POS terminals are not allowed to obtain information relating to a radio waves emitting source (ID information, for example) from the particular printer. The printer is invisible and thereby not detected by the other portable POS terminals. When a certain sales clerk communicates with a printer for print data transmission, the other sales clerks are not allowed to use the particular printer even if standing nearer to the printer.

To solve the problem, in another mobile printing system, different methods have been used for distance detection and data transmission (See Japanese Patent Application Publication No. 2012-138072). In a portable terminal of the proposed system, a plurality of set top boxes connected to a multi-function apparatus is detected by using the Bluetooth communication. Positional data of the portable terminal detected by GPS (Global Positioning System) is transmitted to a server by using the wireless LAN to determine the closest set top box. Printing data is then transmitted to the multi-function apparatus via the closest set top box by using the wireless LAN.

The distance is detected by using the Bluetooth and the GPS while data is transmitted by using the wireless LAN. Accordingly, the Bluetooth communication with the multi-function apparatus is not occupied by the particular portable terminal sending printing data. Any multi-function apparatus (any set top box) is always detectable by any portable terminal. The proposed system is, however, complicated in structure since the GPS is used to detect the distance in addition to the Bluetooth. Further, the system is hardly applied indoors such as a store.

SUMMARY

The purpose of the present invention is to solve the above problem, especially to provide a simpler structure adapted to indoor use too and capable of continuously detecting any information processing apparatus without occupation of a certain printer (information processing apparatus) by a certain portable terminal, thereby enabling execution of a processing by the information processing apparatus at the shortest distance from the portable terminal.

The portable terminal is capable of detecting the closest information processing apparatus based on the intensity of radio waves emitted from the plurality of information processing apparatuses and the neighborhood and received by the portable terminal by using first wireless communication means and instructing the detected information processing apparatus to execute a processing by using second wireless communication means.

Accordingly, the first wireless communication means to detect the closest information processing apparatus is different from the second wireless communication means to instruct the information processing apparatus to execute the processing. Even when a certain information processing apparatus is instructed to execute the processing by a certain portable terminal by using the second wireless communication means, the other portable terminals are allowed to detect the closest information processing apparatus by using the first wireless communication means among from the plurality of information processing apparatuses including the particular one used by the particular portable terminal.

Further, the closest information processing apparatus is detected based on the intensity of received radio waves by using the first wireless communication means. The invention eliminates the need of using the GPS for distance detection, avoiding a complicated structure and allowing indoor use too.

Accordingly, the invention provides a simpler structure adapted to indoor use too and capable of continuously detecting any information processing apparatus without occupation of a certain information processing apparatus by a certain portable terminal, thereby enabling execution of a processing by the information processing apparatus at the shortest distance from the portable terminal.

BRIEF DESCRIPTION OF THE DRAWINGS

FIG. 6A is a flow chart showing an operation example of the mobile POS system of the second embodiment.

DETAILED DESCRIPTION

First Embodiment

Figure 1:
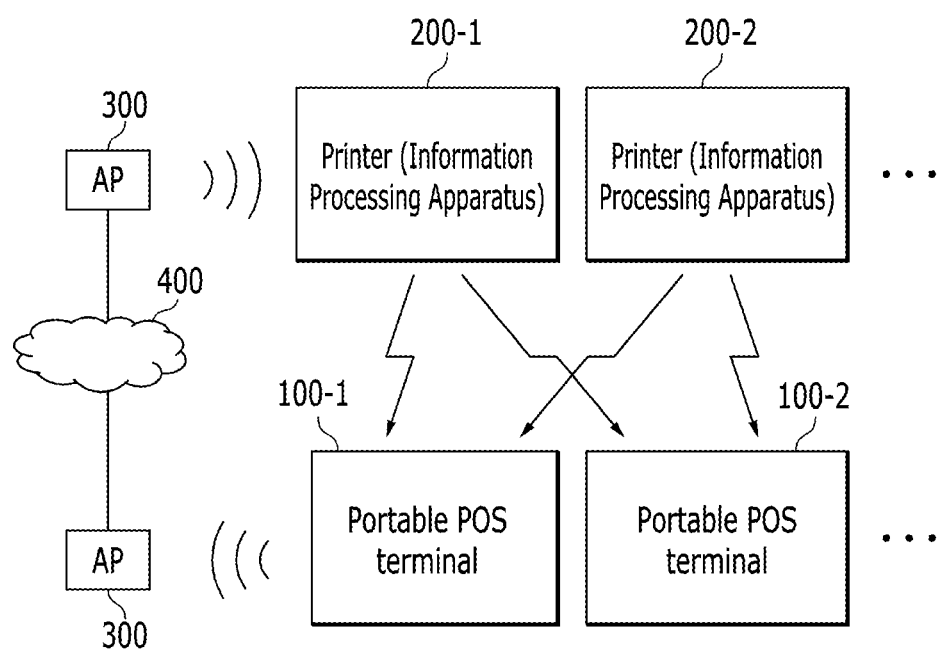
FIG. 1 is a block diagram of a control system for an information processing apparatus using a portable terminal (a mobile POS system) of the first embodiment.

The present invention according to the first embodiment is being described referring to the drawings. FIG. 1 is a block diagram of a control system for an information processing apparatus using a portable terminal of the first embodiment. The control system may be a mobile POS (Point-of Sale) system using a printer and a portable POS terminal such as a tablet computer and a smart phone.

The mobile POS system includes a plurality of portable POS terminals (portable terminal) 100 capable of wireless communication and a plurality of printers (information processing apparatus) 200 capable of wireless communication, enabling execution of a printing by the printer 200 selected by the portable POS terminal 100. The portable POS terminal 100 may be each denoted by a branch number such as 100-1 and 100-2. The printer 200 may be each denoted by a branch number such as 200-1 and 200-2.

The portable POS terminal 100 is configured to communicate with the printer 200 by using the BLE (Bluetooth Low Energy), power saving wireless communication means of the Bluetooth communication (first wireless communication means). The portable POS terminal 100 is also configured to be connected to the printer 200 via an access point 300 and a communication network 400 by using the wireless LAN (Local Area Network) such as Wi-Fi (second wireless communication means).

Figure 2:
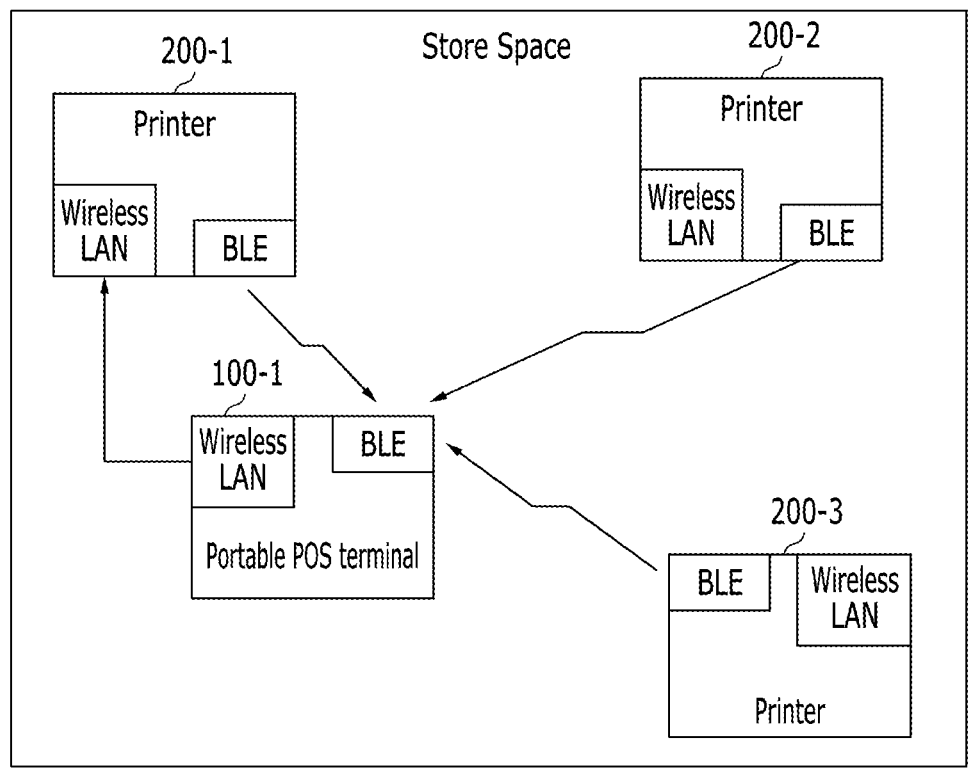
FIG. 2 is an installation example of a portable POS terminal and a printer.

FIG. 2 is an installation example of the portable POS terminal 100 and the printer 200 in a store. The printer 200 (three printers 200-1, 200-2, and 200-3) is fixedly located at a predetermined position in the store. The portable POS terminal 100 (single portable POS terminal 100-1) carried by a sales clerk is freely movable in the store. The portable POS terminal 100 is capable of detecting the closest printer 200 by using the BLE and transmitting printing data to the detected printer 200 by using the wireless LAN.

Figure 3:
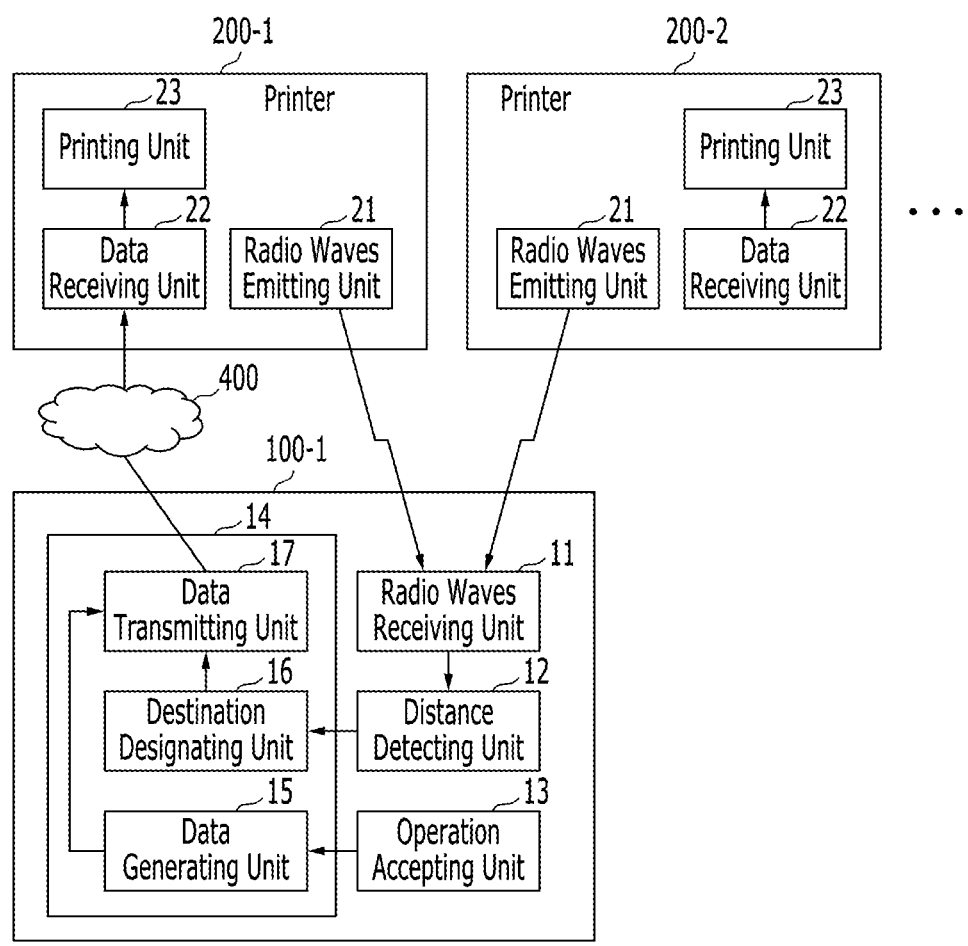
FIG. 3 is a block diagram showing a functional configuration of the portable POS terminal and the printer of the first embodiment.

FIG. 3 is a block diagram showing a functional configuration of the portable POS terminal 100 and the printer 200 of the first embodiment. A single portable POS terminal 100-1 is illustrated for easier understanding. The other portable POS terminals are configured in the same manner.

The portable POS terminal 100 includes a radio waves receiving unit 11, a distance detecting unit 12, an operation accepting unit 13, and a processing execution control unit 14. The functional blocks 11 to 14 are actually served by a CPU (Central Processing Unit), a RAM (Random Access Memory) and a ROM (Read Only Memory). The functions are provided by an operation of a program stored in a storage medium such as the RAM, the ROM, a hard disc, and a semiconductor memory.

The printer 200 includes a radio waves emitting unit 21, a data receiving unit 22, and a printing unit 23. The functional blocks 21 to 23 are actually served by the CPU, the RAM and the ROM. The functions are provided by the operation of the program stored in the storage medium such as the RAM, the ROM, the hard disc, and the semiconductor memory.

The radio waves emitting unit 21 of the printer 200 uses the BLE to continuously emit radio waves containing its own ID (identification) information. The radio waves receiving unit 11 of the portable POS terminal 100 uses the BLE to continuously receive the radio waves from one or more printers 200 located within the communication range of the BLE.

The distance detecting unit 12 is capable of detecting the printer 200 located at the shortest distance from the portable POS terminal 100 based on the intensity of radio waves received by the radio waves receiving unit 11. Specifically, the distance detecting unit 12 detects the printer 200-1 emitting the strongest radio waves (the printer 200 identified by the ID information contained in the radio waves) as the printer located at the shortest distance from the portable POS terminal 100 based on the radio waves emitted from the radio waves emitting unit 21 of one or more printers 200-1, 200-2, etc. and received by the radio waves receiving unit 11 of the portable POS terminal 100.

The operation accepting unit 13 is capable of accepting an operation by the sales clerk carrying the portable POS terminal 100 to execute a printing of a receipt. The operation includes reading a barcode on an item and issuing a printing order. The processing execution control unit 14 is capable of instructing the detected printer 200-1 to execute a printing via the communication network 400 of the wireless LAN.

The processing execution control unit 14 includes a data generating unit 15, a destination designating unit 16, and a data transmitting unit 17. The data generating unit 15 is capable of generating printing data necessary to execute a printing upon acceptance of the printing order by the operation accepting unit 13. Specifically, the data generating unit 15 generates printing data necessary to print a receipt for the purchased item whose barcode has been scanned.

The destination designating unit 16 is capable of designating the detected printer 200-1 as the destination of the generated printing data. The portable POS terminal 100 has a plurality of printer drivers previously installed for the available printers 200-1, 200-2, etc. The printer driver each contains address information of the printer each. The destination designating unit 16 selects the printer driver of the detected printer 200-1 among from the plurality of installed printer drivers, thereby designating the destination of the printing data.

A single printer driver common to the available printers 200-1, 200-2, etc. may be installed instead. The destination designating unit 16 may select the detected printer 200-1 in the common printer driver, thereby designating the destination.

The data transmitting unit 17 is capable of transmitting the generated printing data to the designated printer 200-1, thereby instructing the printer 200-1 to execute a printing. The data receiving unit 22 of the printer 200-1 receives the printing data transmitted from the data transmitting unit 17 of the portable POS terminal 100. The printing unit 23 is capable of printing the receipt based on the received printing data.

Figure 4A:
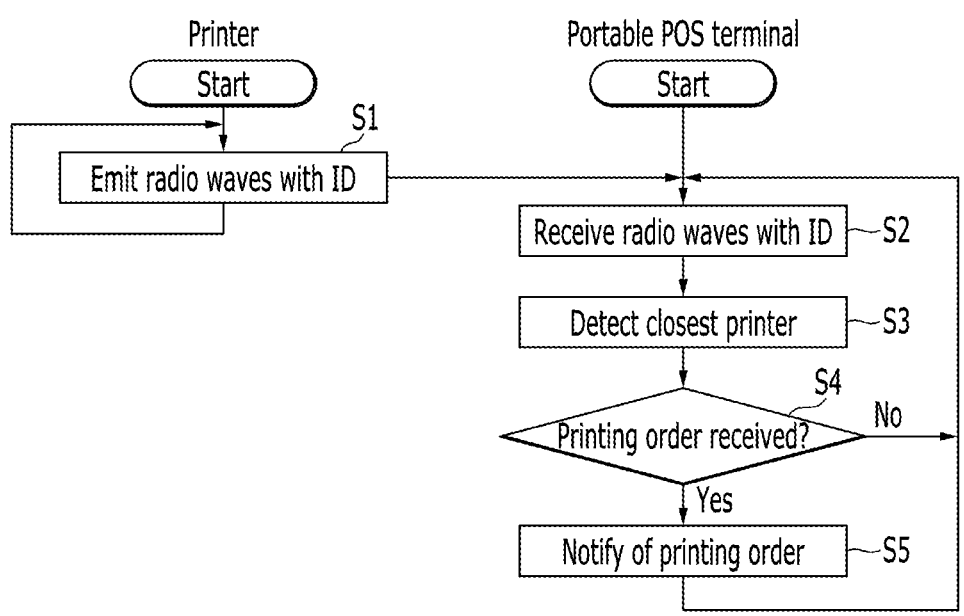
FIG. 4A is a flow chart showing an operation example of the mobile POS system of the first embodiment.
Figure 4B:
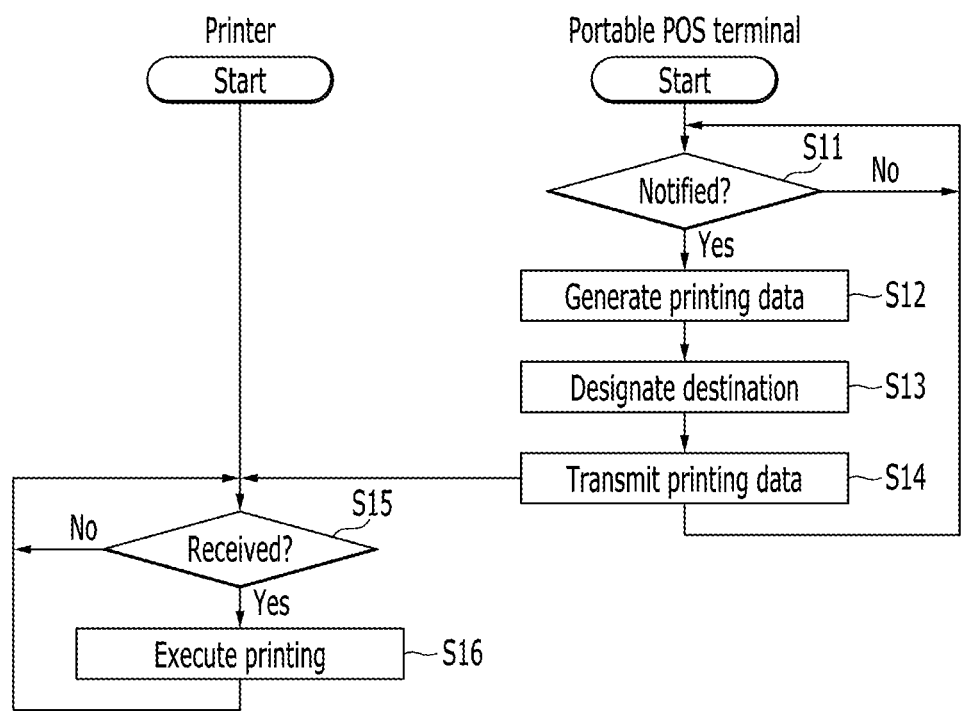
FIG. 4B is another flow chart showing an operation example of the mobile POS system of the first embodiment.

FIG. 4A and FIG. 4B are flow charts showing an operation example of the mobile POS system of the first embodiment. FIG. 4A is an example of communication by using the BLE (first wireless communication means). FIG. 4B is an example of execution of a printing by using the wireless LAN (second wireless communication means). The flow charts in FIGS. 4A and 4B are concurrently executed.

The radio waves emitting unit 21 of the printer 200 uses the BLE to emit radio waves containing its own ID information (Step S1). Each of the printers 200-1, 200-2, etc. emits radio waves containing its own ID information from the radio waves emitting unit 21. The radio waves emitting unit 21 may continuously repeat such radio waves emission.

The radio waves receiving unit 11 of the portable POS terminal 100 receives the radio waves emitted from the radio waves emitting unit 21 (Step S2). Each of the portable POS terminals 100-1, 100-2, etc. continuously receives the radio waves emitted from one or more printers 200-1, 200-2, etc. located within the communication range of the BLE.

The distance detecting unit 12 detects the printer 200-1 at the shortest distance from the portable POS terminal 100 based on the intensity of the radio waves emitted from one or more printers 200 and received by the radio waves receiving unit 11 (Step S3). The operation accepting unit 13 determines whether the printing order is accepted (Step S4). In the case that the order is not accepted, the Step S2 operation is resumed. In the case that the order is accepted, the operation accepting unit 13 notifies the processing execution control unit 14 of the acceptance of the printing order (Step S5). The Step S2 operation is then resumed.

The processing execution control unit 14 determines whether the notice from the operation accepting unit 13 is received (Step S11). In the case that the notice is received, the data generating unit 15 generates printing data necessary to execute a printing of a receipt (Step S12).

The destination designating unit 16 designates the detected printer 200-1 as the destination of the generated printing data (Step S13). The data transmitting unit 17 transmits the printing data to the designated printer 200-1 by using the wireless LAN, thereby instructing the designated printer 200-1 to execute the printing (Step S14). The Step S11 operation is then resumed.

The data receiving unit 22 of the printer 200-1 determines whether the printing data is received (Step S15). In the case that the printing data is received, the printing unit 23 prints a receipt based on the printing data (Step S16). The Step S15 operation is then resumed.

As described above, the printer 200 at the shortest distance from the portable POS terminal 100 is detected based on the intensity of the radio waves emitted from the plurality of printers 200 and received by the portable POS terminal 100 by using the BLE. Printing data is transmitted to the detected printer 200 by using the wireless LAN, which is different communication means from the BLE, thereby instructing the printer to execute a printing.

Accordingly, even while the portable POS terminal 100-1 transmits printing data to the printer 200-1 by using the wireless LAN, the other portable POS terminals 100-2, 100-3, etc. are allowed to use the BLE to receive the radio waves from the plurality of printers 200 including the particular printer 200-1, thereby detecting the closest printer 200.

Further, the printer 200 at the shortest distance is detected by using the BLE in the case the printer 200 emits the strongest radio waves, eliminating the need of using the GPS (Global Positioning System) for distance detection. The invention provides a simpler structure suitable for indoor use too.

Accordingly, the first embodiment of the invention provides a simpler structure suitable for indoor use too and capable of avoiding occupation of the printer 200 by the particular portable POS terminal 100, thereby allowing to detect the distance of any printer 200 and select one at the shortest distance from the portable POS terminal 100 to execute the printing.

The portable POS terminal 100 continuously receives the BLE radio waves and continuously detects the printer 200 at the shortest distance from the portable POS terminal 100. The invention is not limited to the embodiment. The Step 3 operation may follow the Step S12 operation. The detection of the printer 200 may be executed only when the printing order is given.

Further, a printer status checking step by using the wireless LAN may be provided before transmitting the printing data (Step S14) and after designating the destination (Step S13). The printer status includes online/offline, paperout, and cover open/close. In the case that the designated printer is determined unavailable as the result of the checking step, Step S2 may be resumed to detect the printer from among the available printers and then designate the detected printer as the destination.

Second Embodiment

The second embodiment of the invention is being described referring to the drawings. The overall structure of the control system for the information processing apparatus using the portable terminal (mobile POS system) is similar to FIG. 1.

Figure 5:
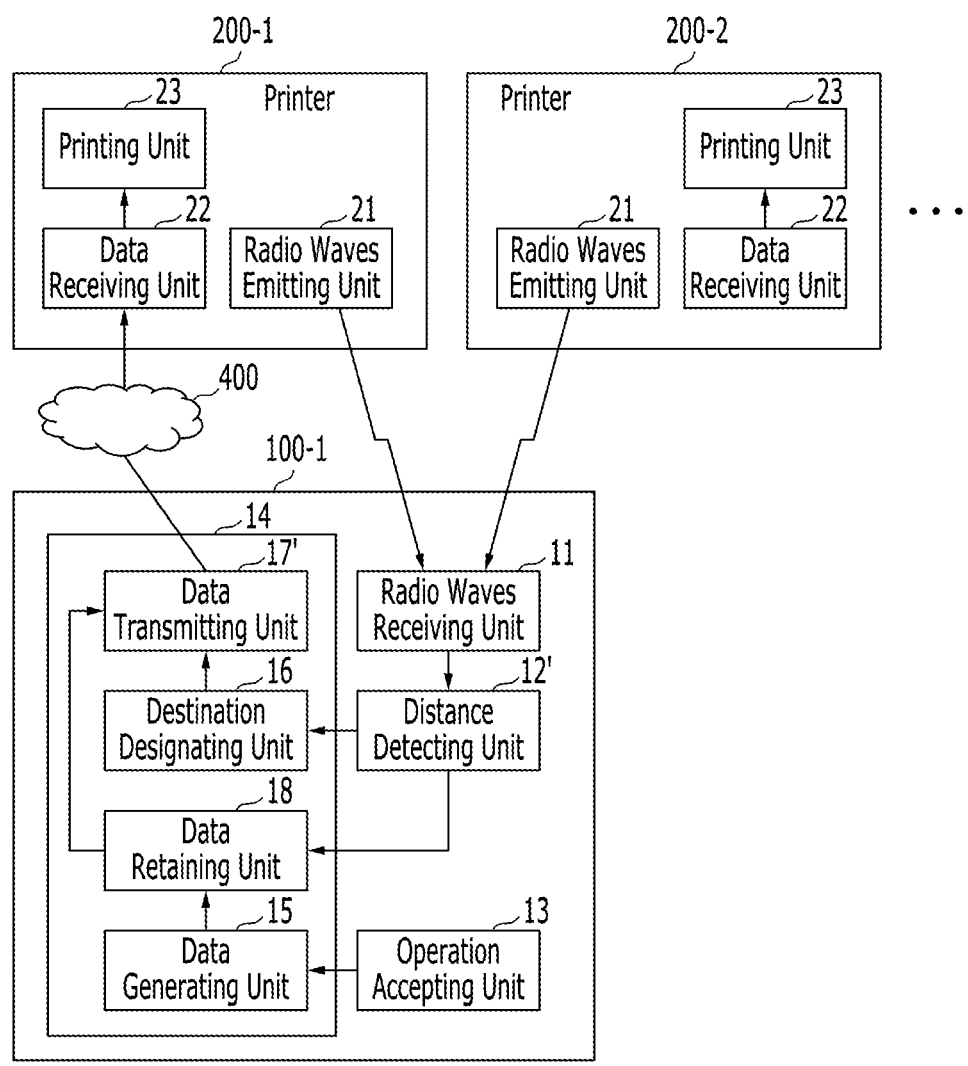
FIG. 5 is a block diagram showing a functional configuration of the portable POS terminal and the printer of the second embodiment.

FIG. 5 is a block diagram showing a functional configuration of the portable POS terminal 100 and the printer 200 of the second embodiment. For any functional block having the same symbol as FIG. 3, the explanation is being omitted. The portable POS terminal 100 further includes a data retaining unit 18. The distance detecting unit 12 and the data transmitting unit 17 are respectively replaced by a distance detecting unit 12' and a data transmitting unit 17'.

The distance detecting unit 12' is configured to detect the printer 200 at the shortest distance from the portable POS terminal 100 only when the intensity of the radio waves received by the radio waves receiving unit 11 is on or above a predetermined threshold and the strongest among the plurality of printers 200. Specifically, the distance detecting unit 12' detects the printer 200 emitting radio waves of the strongest intensity only when at least one of the radio waves is detected on or above the predetermined intensity threshold.

Accordingly, any printer 200 is not detected as a possible destination of the printing data in the case the radio waves does not reach the predetermined intensity threshold. Any printer 200 located apart from the portable POS terminal 100 beyond a predetermined distance is not selected as the destination even when located at the shortest distance from the portable POS terminal 100.

The data retaining unit 18 is configured to retain the generated printing data in response to the printing order from the user. In the case the radio waves on or above the predetermined intensity threshold has not been detected when the printing data is generated, the generated printing data is retained by the data retaining unit 18 until the radio waves on or above the predetermined intensity threshold is detected by the distance detecting unit 12'.

The destination designating unit 16 is configured to designate the detected printer 200 as the destination of the printing data only when the radio waves on or above the predetermined intensity threshold is detected. The data transmitting unit 17' is configured to transmit the retained printing data to the designated printer 200, thereby instructing the printer 200 to execute a printing.

In the case the radio waves on or above the predetermined intensity threshold has been detected when the printing data is generated, the retained printing data is immediately transmitted by the data transmitting unit 17' to the detected printer 200 at the shortest distance from the portable POS terminal 100.

In the case the radio waves on or above the predetermined intensity threshold has not been detected when the printing data is generated, the generated printing data remains retained by the data retaining unit 18. As the user carrying the portable POS terminal 100 moves toward any one of the printers 200 to allow the distance detecting unit 12' to detect the radio waves on or above the predetermined intensity threshold, the the retained printing data is transmitted by the data transmitting unit 17' to the detected printer 200 at the shortest distance from the portable POS terminal 100.

Figure 6B:
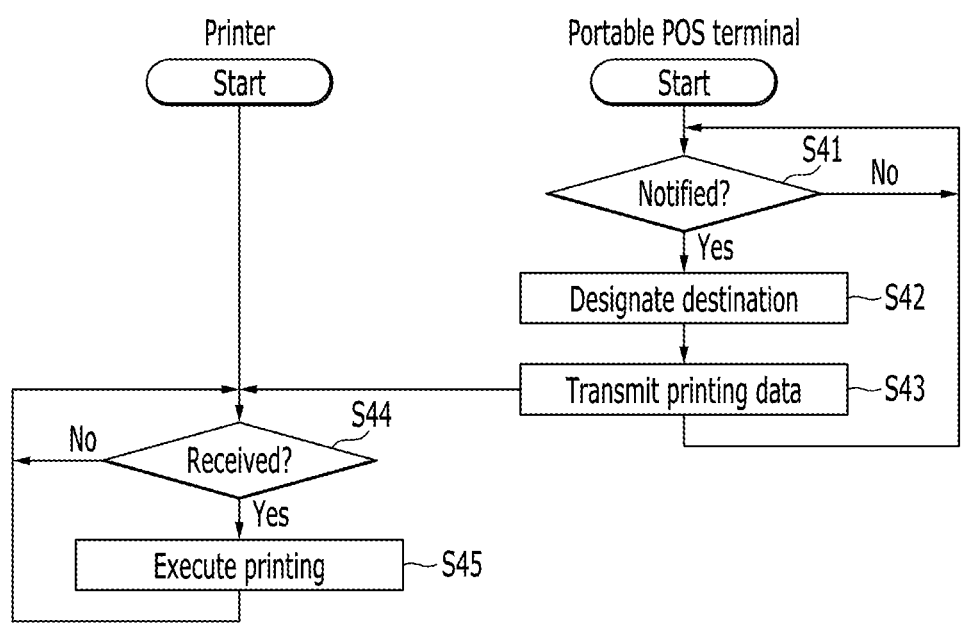
FIG. 6B is another flow chart showing an operation example of the mobile POS system of the second embodiment.

FIG. 6A and FIG. 6B are flow charts showing an operation example of the mobile POS system of the second embodiment. FIG. 6A is an example of communication by using the BLE (first wireless communication means). FIG. 6B is an example of execution of a printing by using the wireless LAN (second wireless communication means). The flow charts are concurrently executed.

The radio waves emitting unit 21 of the printer 200 uses the BLE to emit radio waves containing its own ID information (Step S21). Each printer 200-1, 200-2, etc. emits radio waves containing own ID information from the emitting part 21. The emitting part 21 continuously repeats such radio waves emission.

The radio waves receiving unit 11 of the portable POS terminal 100 receives the radio waves emitted from the radio waves emitting unit 21 (Step S22). Each portable POS terminal 100-1, 100-2, etc. continuously receives the radio waves emitted from one or more printers 200-1, 200-2, etc. located within the communication range of the BLE.

The distance detecting unit 12' determines whether any of the radio waves emitted from one or more printers 200 and received by the radio waves receiving unit 11 is on or above the predetermined intensity threshold (Step S23). In the case that none of the received radio waves is on or above the predetermined intensity threshold, the operation accepting unit 13 determines whether a printing order is accepted (Step S24). In the case that the order has not been accepted, the Step S22 operation is resumed.

In the case that the order is accepted, the data generating unit 15 generates printing data necessary to execute a printing of a receipt (Step S25). The Step S22 operation is then resumed.

In the case that the radio waves on or above the predetermined intensity threshold is detected in Step S23, the distance detecting unit 12' specifies the strongest radio waves from among the detected radio waves on or above the threshold, thereby detecting the printer 200 at the shortest distance from the portable POS terminal 100 (Step S27). The data generating unit 15 then determines whether the printing data has been retained by the data retaining unit 18 (Step S28).

In the case that the printing data is retained by the data retaining unit 18, such situation is assumed as the user has moved closer to at least one of the printers 200 from the location apart by a predetermined distance where the printing order was issued. The data generating unit 15 then notifies the destination designating unit 16 of the acceptance of the printing order (Step S32). In the case that no printing data is retained, the operation accepting unit 13 determines whether a printing order is accepted (Step S29). In the case that the order is not accepted, the Step S22 operation is resumed.

In the case that the order is accepted by the operation accepting unit 13, such situation is assumed as the printing order is given by the user on the portable POS terminal 100 at a location within the predetermined distance from at least one of the printers 200. The data generating unit 15 then generates printing data necessary to execute a printing of the receipt (Step S30) and have the generated printing data retained by the data retaining unit 18 (Step S31). The data generating unit 15 immediately notifies the destination designating unit 16 of the acceptance of the printing order (Step S32). The Step S22 operation is then resumed.

The destination designating unit 16 determines whether the notice of the acceptance of the printing order is received (Step S41). In the case that the notice is received, the destination designating unit 16 designates the detected printer 200 as the destination of the printing data (Step S42). The data transmitting unit 17' transmits the retained printing data to the designated printer 200 by using the wireless LAN (Step S43). The Step S41 operation is then resumed.

The data receiving unit 22 determines whether the printing data from the portable POS terminal 100 is received (Step S44). In the case that the printing data is received, the printing unit 23 executes the printing of a receipt based on the received printing data (Step S45). The Step S15 operation is then resumed.

As described above, the printer 200 is detected to be located at the shortest distance from the portable POS terminal 100 only when the intensity of the radio waves is on or above the predetermined threshold and the strongest among the printers. Further, when a printing order is given, the generated printing data is retained by the data retaining unit 18 without designating the destination of the printing data. When the radio waves on or above the predetermined intensity threshold is detected, the detected printer 200 at the shortest distance from the portable POS terminal 100 is designated as the destination of the printing data.

Accordingly, the second embodiment of the invention also provides a simpler structure suitable for indoor use too and capable of continuously detecting the printer 200 without occupation of a certain printer by a certain portable POS terminal 100 thereby enabling execution of a processing by the printer 200 at the shortest distance from the portable POS terminal 100.

The portable POS terminal 100 is allowed to issue a printing order even when located beyond the predetermined distance from any of the printers 200. The given order can be executed as the user carrying the portable POS terminal 100 moves closer to any of the printers 200 within the predetermined distance. The sales clerk is allowed to finish a settlement procedure anywhere in the store by using the portable POS terminal 100 without searching for the printer 200, thereby shortening the waiting time.

In the second embodiment, while the portable POS terminal 100 continuously receives the BLE radio waves, the printer 200 at the shortest distance from the portable POS terminal 100 is detected whenever any of the received radio waves is on or above the predetermined intensity threshold. The invention is not limited to this embodiment. The Step S41 operation may be followed by the Step S27 operation instead. The printer 200 at the shortest distance from the portable POS terminal 100 may be detected only when a printing order is given.

In the second embodiment, in the case that a printing order has been given by the portable POS terminal 100 located beyond the predetermined distance from any of the printers 200, printing data is automatically transmitted from the portable POS terminal 100 to the printer 200 when brought within the predetermined range as the user moves closer thereto. The invention is not limited to this embodiment. For example, when the user comes closer to at least one of the printers 200 within the predetermined range, a print button may be displayed on the portable POS terminal 100. The printing data may be transmitted only when the print button is pressed.

Third Embodiment

Figure 7:
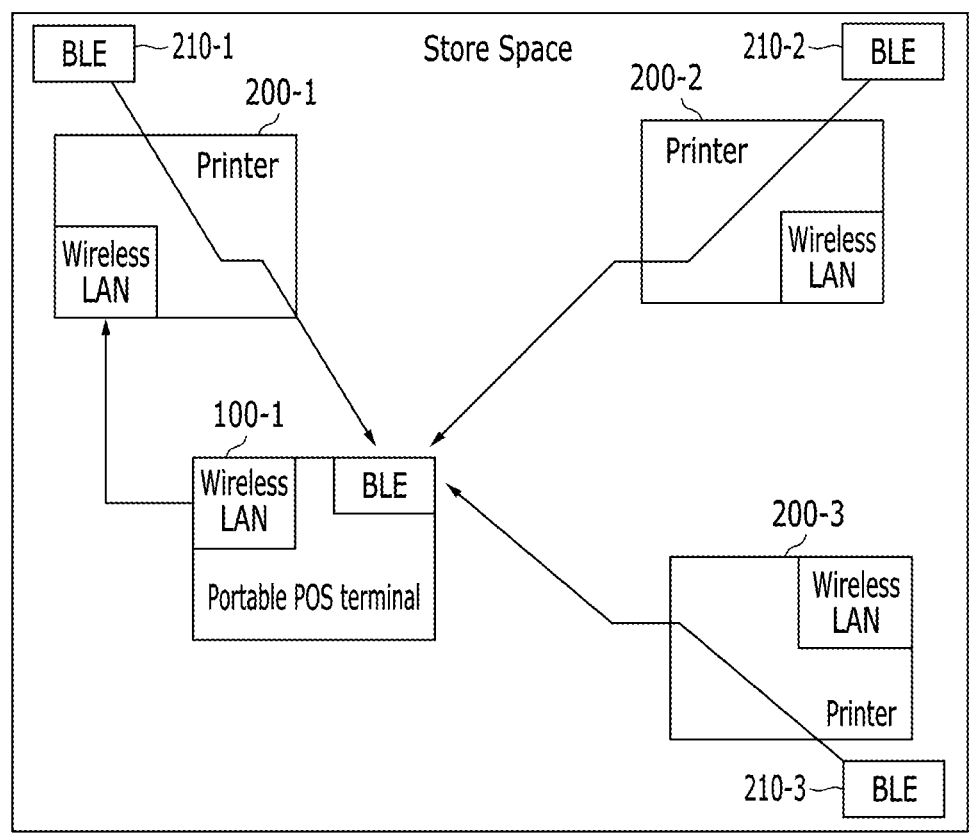
FIG. 7 is an installation example of the portable POS terminal, the printer, and a wireless communication circuit of the third embodiment.

The third embodiment of the invention is being described referring to the drawings. The overall structure of the control system for the information processing apparatus using the portable terminal (mobile POS system) is similar to FIG. 1 except that a wireless communication circuit 210 having the radio waves emitting unit 21 for the BLE is provided in the neighborhood of the printer 200 located at the predetermined position in the store. Specifically, as shown in FIG. 7, a plurality of wireless communication circuit 210-1, 210-2, and 210-3 are respectively mounted on the ceiling in the neighborhood of the printers 200-1, 200-2, and 200-3.

Figure 8:
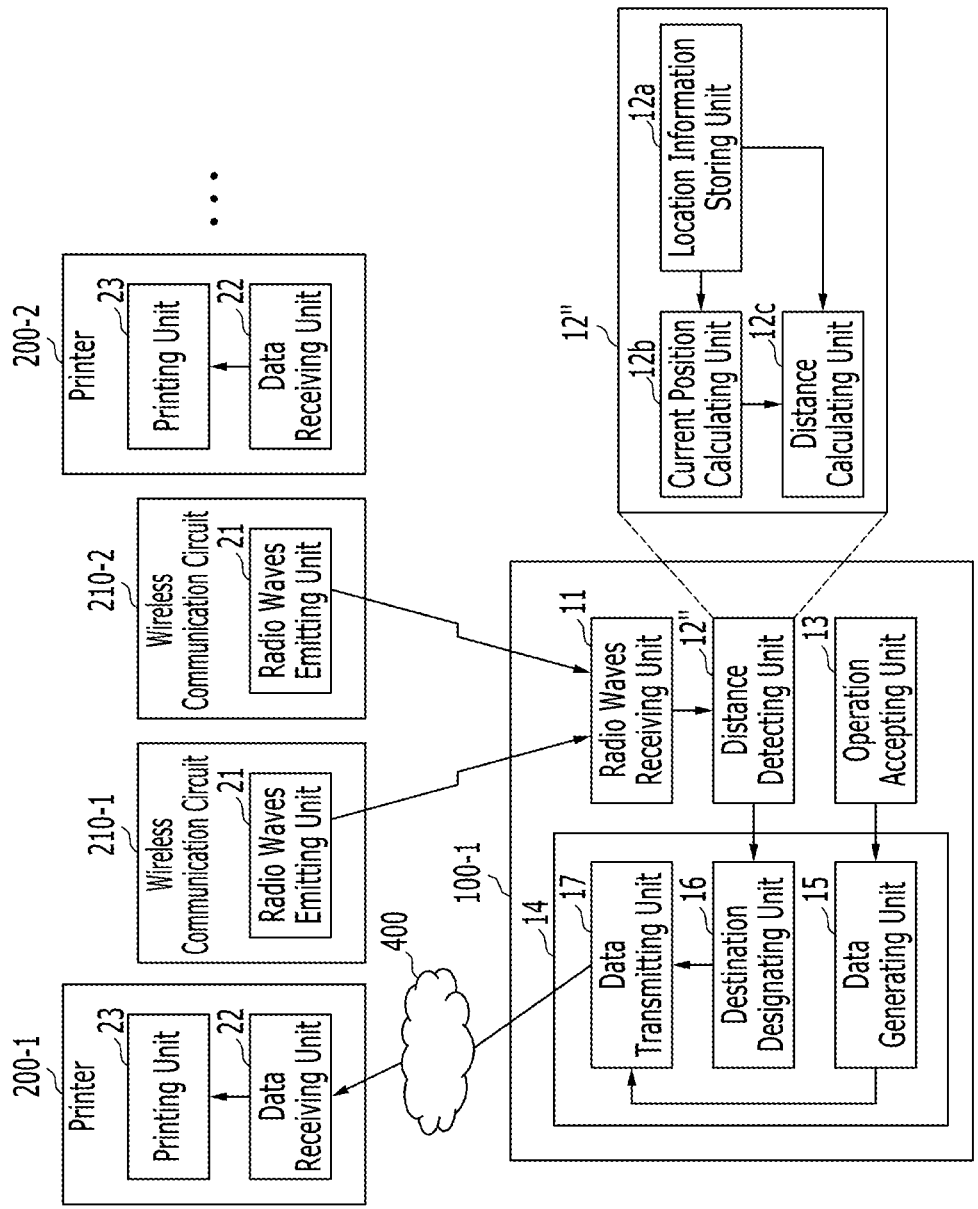
FIG. 8 is a block diagram showing a functional configuration of the portable POS terminal, the printer, and the wireless communication circuit of the third embodiment.

FIG. 8 is a block diagram showing a functional configuration of the portable POS terminal 100, the printer 200, and the wireless communication circuit 210 of the third embodiment. For any functional block having the same symbol as FIG. 3, the explanation is being omitted. The distance detecting unit 12 is replaced by a distance detecting unit 12". The distance detecting unit 12" includes a location information storing unit 12a, a current position calculating unit 12b, and a distance calculating unit 12c. The radio waves emitting unit 21 is provided in the wireless communication circuit 210, not in the printer 200.

The location information storing unit 12a is configured to store location information of the wireless communication circuits 210-1, 210-2, and 210-3 and the printers 200-1, 200-2, and 200-3 in the store space. The store space is, for example, regarded as a two-dimensional coordinate plane where the location information is represented by x and y coordinates.

The current position calculating unit 12b is configured to calculate the current position (x and y coordinates) of the portable POS terminal 100, by using a known three-dimensional or two-dimensional positioning method, based on the location information of the wireless communication unit 210-1, 210-2, and 210-3 emitting the radio waves and the intensity of the radio waves received by the radio waves receiving unit 11.

The distance calculating unit 12c is configured to calculate the distance from the portable POS terminal 100 to the printers 200-1, 200-2, and 200-3 respectively based on the calculated current position of the portable POS terminal 100 and the stored location information of the printers, thereby detecting the printer 200 at the shortest distance from the portable POS terminal third embodiment of the invention also provides a simpler structure suitable for indoor use too and capable of continuously detecting the printer 200 without occupation of a certain printer by a certain portable POS terminal 100 thereby enabling execution of a processing by the printer 200 at the shortest distance from the portable POS terminal 100.

In the third embodiment, the wireless communication circuit 210 provided with the BLE radio waves emitting unit 21 is mounted on the ceiling. In the first and second embodiments, however, the radio waves from the printer 200 placed on the store floor may be interfered by any obstacle such as a display shelf and people, resulting in a failure or deterioration of radio waves transmission. Such problem is avoided when the wireless communication circuit 210 is provided on the ceiling since there is no or few interference between the radio waves emitting unit 21 and the portable POS terminal carried by the sales clerk.

The distance detecting unit 12" replaces the distance detecting unit 12 as a modified embodiment of FIG. 3 hereinabove. The distance detecting unit 12" may replace the distance detecting unit 12' as a modified embodiment of FIG. 5.

The distance detecting unit 12" detects the printer 200 at the shortest distance from the portable POS terminal 100 when the calculated distance is on or below a predetermined threshold and the shortest among the plurality of printers 200. In the case the printer 200 on or below the predetermined distance threshold is not detected when the printing data has been generated by the data generating unit 15, the generated printing data is retained by the data retaining unit 18. When the printer 200 on or below the predetermined distance threshold is detected, the printer 200 detected to be located at the shortest distance from the portable POS terminal 100 is designated as the destination of the printing data.

Fourth Embodiment

Figure 9:
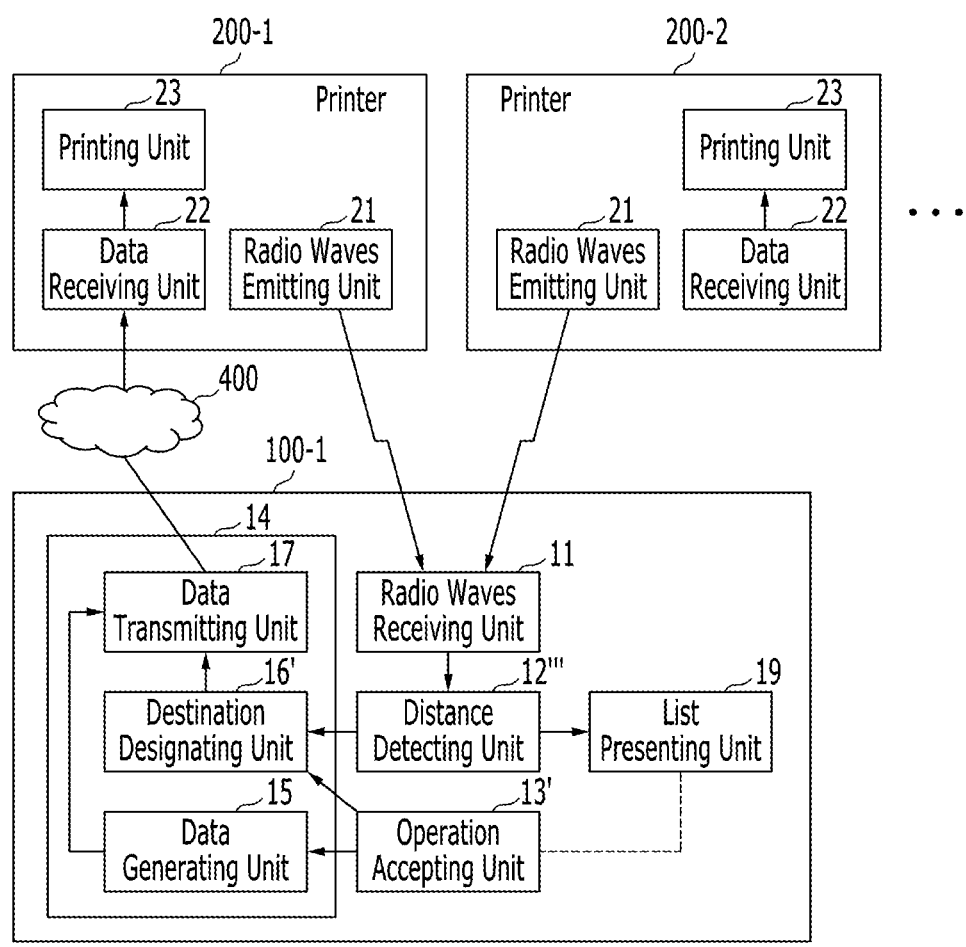
FIG. 9 is a block diagram showing a functional configuration of the portable POS terminal and the printer of the fourth embodiment.

The fourth embodiment of the invention is being described referring to the drawings. The overall structure of the control system for the information processing apparatus using the portable terminal (mobile POS system) is similar to FIG. 1. FIG. 9 is a block diagram showing a functional configuration of the portable POS terminal 100, and the printer 200 of the fourth embodiment. For any functional block having the same symbol as FIG. 3, the explanation is being omitted.

The portable POS terminal 100 includes a distance detecting unit 12''', an operation accepting unit 13', and a destination designating unit 16' instead of the distance detecting unit 12, the operation accepting unit 13, and the destination designating unit 16. The portable POS terminal 100 further includes a list presenting unit 19.

The distance detecting unit 12''' is configured to detect the printer 200 at the shortest distance from the portable POS terminal 100 and a predetermined number of the printers 200 in the ascending order of the distance from the portable POS terminal 100. The number of the printers 200 may be a particular number such as two and three, or may be all as far as the radio waves are detected.

The list presenting unit 19 is configured to present a list of the detected predetermined number of printers 200 to prompt the user to select one of them. The list presenting unit 19 may present a list of printer names on a display (not shown) based on the ID information contained in the radio waves received by the radio waves receiving unit 11 referring to the stored table information containing the printer name associated with the ID information for each printer 200.

Figure 10:
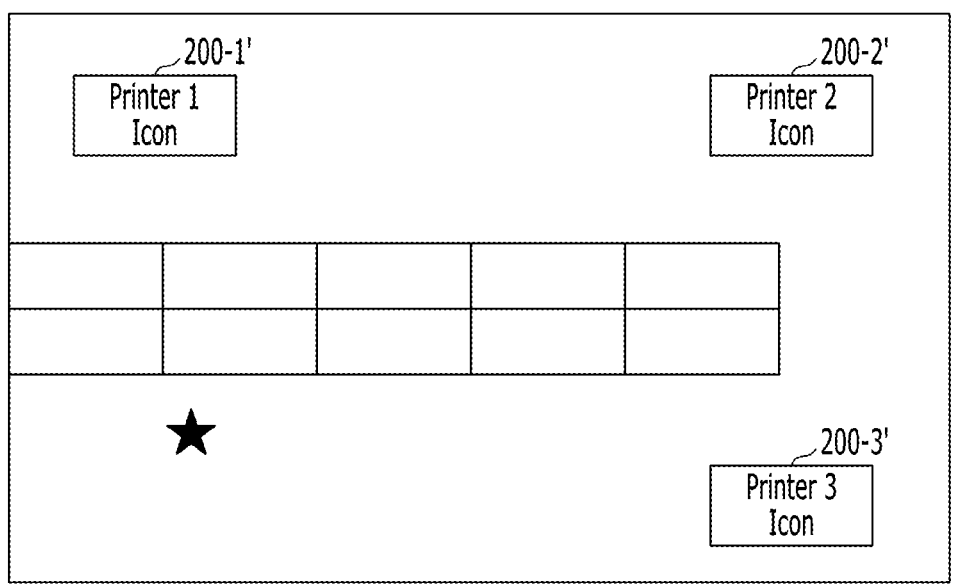
FIG. 10 is an example of a floor layout view presented by a list presenting unit of the fourth embodiment.

The list presenting unit 19 may present a printer icon on the display based on the ID information contained in the received radio waves referring to the stored table information containing the printer icon identifying the printer 200 associated with the ID information. The printer icons 200-1', 200-2', and 200-3' may be appropriately superimposed on a store floor layout view containing the display shelves as shown in FIG. 10.

The operation accepting unit 13' is configured to accept the selection by the user of a desired printer 200 from the presented printer list. The processing execution control unit 14 is configured to transmit the printing data to the selected printer 200 by using the wireless LAN, thereby instructing the printer to execute a printing.

The data generating unit 15 is configured to generate printing data necessary to execute a printing when the operation accepting unit 13' accepts the printing order from the user. The destination designating unit 16' is configured to detect the selected printer 200 as the destination of the printing data when the operation accepting unit 13' accepts the selection by the user of the desired printer 200. The data transmitting unit 17 is configured to transmit the printing data to the designated printer 200 by using the wireless LAN, thereby instructing the printer to execute a printing.

Accordingly, the fourth embodiment of the invention also provides a simpler structure suitable for indoor use too and capable of continuously detecting the printer 200 without occupation of a certain printer by a certain portable POS terminal 100, thereby enabling execution of a processing by the printer 200 at the shortest distance from the portable POS terminal 100.

The user is allowed to select a desirable one from the plurality of printers 200 detected by the distance detecting unit 12'''. In FIG. 10, though the printer 200-1 is located at the shortest distance from the user standing at the marked position, the printer 200-3 is substantially nearer than the printer 200-1 due to the arrangement of the display shelf. The user is allowed to instruct the printer 200-3 to execute a printing.

Though the fourth embodiment has been described as a variation of the first embodiment, it may be a variation of the second or third embodiment.

Fifth Embodiment

Figure 11:
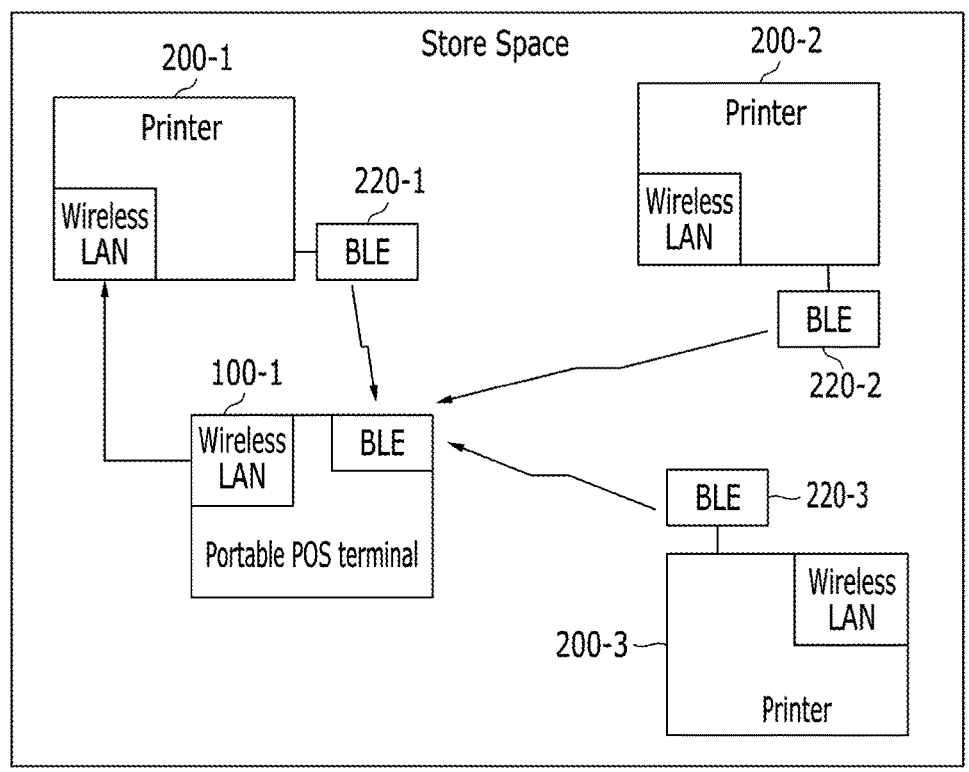
FIG. 11 is an installation example of the portable POS terminal, the printer, and a USB dongle of the fifth embodiment.

The fifth embodiment of the invention is being described referring to the drawings. The overall structure of the control system for the information processing apparatus using the portable terminal (mobile POS system) is similar to FIG. 1 except that a USB dongle 220 provided with the BLE radio waves emitting unit 21 is connected to a USB port of the printer 200. Specifically, as shown in FIG. 11, a plurality of USB dongles 220-1, 220-2, and 220-3 are respectively connected to the printers 200-1, 200-2, and 200-3.

The USB dongle 220 is an external device connected to the printer 200 by one-to-one basis via a (built-in or external) USB interface, being power-supplied by the printer 200 to emit radio waves containing its own ID information by using the BLE. There is no data communication via the USB interface between the USB dongle 220 and the printer 200.

Figure 12:
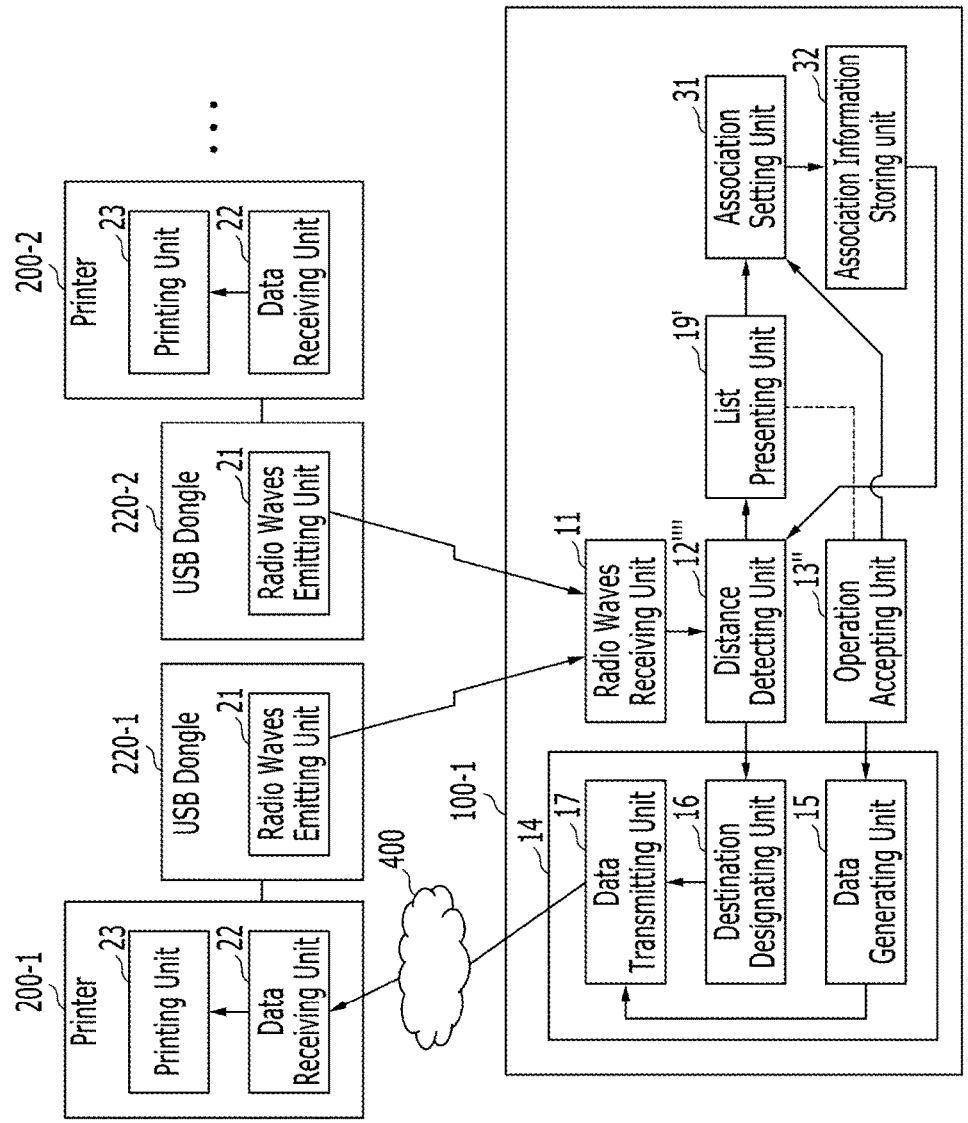
FIG. 12 is a block diagram showing a functional configuration of the portable POS terminal, the printer, and the USB dongle of the fifth embodiment.

FIG. 12 is a block diagram showing a functional configuration of the portable POS terminal 100, the printer 200, and the USB dongle of the fifth embodiment. For any functional block having the same symbol as FIG. 3, the explanation is being omitted.

The portable POS terminal 100 further includes a list presenting unit 19', an association setting unit 31, and an association information storing unit 32. The portable POS terminal 100 includes a distance detecting unit 12'''' and a operation accepting unit 13'' instead of the distance detecting unit 12 and the operation accepting unit 13 in FIG. 3.

The ID information of the USB dongle 220 having the radio waves emitting unit 21 is required to be previously associated with the ID information (IP address, MAC address, printer name, and serial number, etc.) of the printer 200 to be connected.

The ID information of the USB dongle 220 and the ID information of the printer 200 may be associated to each other by the portable POS terminal 100 via software, specifically by the list presenting unit 19', the association setting unit 31, and the association information storing unit 32, thereby the emitted ID information of the USB dongle 220 being regarded as information for identifying the printer 200.

The list presenting unit 19' shows a list of one or more USB dongle 220 detected by the distance detecting unit 12'''' on the display (not shown) of the portable POS terminal 100. Particularly, the ID information of the USB dongle 220 contained in the radio waves emitted from the emitting unit 21 and received by the radio waves receiving unit 11 may be shown together with the intensity of radio waves. A list of printers 200 available via the wireless LAN or having a connection history may be shown too.

The operator is allowed to select the USB dongle 220 and the connected printer 200 from the list. When the operator comes close to one of the printers 200, the radio waves from the USB dongle 220 connected to the particular printer 200 becomes the strongest. The operator may select the USB dongle 220 of the strongest radio waves and the particular printer 200 located at the shortest distance.

The operation accepting unit 13" accepts the operation by the user to select a set of USB dongle 220 and printer 200 from the list presented by the list presenting unit 19'. The association setting unit 31 associates the ID information of the selected USB dongle 220 and the ID information of the printer 200 to be connected in response to the user operation accepted by the operation accepting unit 13'. The association information is stored in the association information storing unit 32. The operation accepting unit 13" also accepts a series of operations by the user to issue a receipt similarly to the operation accepting unit 13 in FIG. 3.

The distance detecting unit 12"" detects the USB dongle 220 at the shortest distance from the portable POS terminal 100 based on the intensity of radio waves received by the radio waves receiving unit 11. Particularly, the USB dongle 220 emitting the strongest radio waves is detected from one or more radio waves emitted from one or more USB dongles 220-1, 220-2, etc. emitted by the radio waves emitting unit 21 and received by the receiving unit 11. The distance detecting unit 12"" may further detect the printer 200 at the shortest distance from the portable POS terminal 100 by acquiring the ID information of the printer 200 associated with the ID information of the USB dongle 220 contained in the strongest radio waves with reference to the association information stored in the association information storing unit 32.

Even during data transmission from a certain portable POS terminal 100-1 to a certain printer 200-1 by using the wireless LAN, the other portable terminals 100-2, 100-3, etc. are allowed to receive the radio waves from the USB dongle connected to the printer 200 by using the BLE and to detect the closest printer 200 among from the plurality of printers including the particular one 200-1 used by the particular portable terminal.

The closest printer 200 is detected based on the intensity of the radio waves received by using the BLE, eliminating the need of using the GBS for distance detection, thereby avoiding a complicated structure and enabling indoor use too.

According the fifth embodiment, only the printer 200 associated with the USB dongle 220 may be selected by the portable POS terminal 100. Any printer 200 not associated with the USB dongle 220 is not available, therefore accessibility to the printer 200 is restricted, improving the security.

Though the fifth embodiment has been described as a variation of the first embodiment, it may be a variation of the second or fourth embodiment.

The invention is not limited to the mobile POS system including the portable POS terminal 100 and the printer 200. The printer 200 may be replaced by a cash drawer. The portable POS terminal 100 may select a cash drawer at the shortest distance by using the BLE and transmit an unlock command to the detected cash drawer by using the wireless LAN.

The invention is not limited to the BLE as the first communicating means and the wireless LAN as the second communicating means. The first communicating means may be the UHF (Ultra High Frequency) band of the RFID (Radio Frequency Identification). The distance may be measured by using reflection of a laser light emitted from the portable POS terminal 100 (delay time reflected at the printer 200 and returned to the portable POS terminal 100). The first communicating means may be the Bluetooth communication.

The Bluetooth may be used to detect the distance while another communication means may be used for data transmission. The printer 200 is not required to establish connection with the particular portable POS terminal 100 via Bluetooth. Accordingly, the printer 200 is capable of continuously emitting radio waves containing its own ID information to the plurality of portable POS terminals 100 without occupation of a certain printer by a certain portable POS terminal 100, thereby enabling execution of a processing by the printer 200 at the shortest distance from the portable POS terminal 100.

The first communication means may be the BLE, RFID, or laser light while the second communication means may be the Bluetooth.

The invention may be embodied in the following configuration in addition to the first to fifth embodiments.

(1) A control system for an information processing apparatus using a portable terminal comprising a plurality of information processing apparatuses capable of wireless communication and a plurality of portable terminals capable of wireless communication, the control system being configured to execute a processing by one of the plurality of information processing apparatuses selected by the portable terminal, comprising: a distance detecting unit of the portable terminal configured to detect the information processing apparatus at the shortest distance from the portable terminal based on the intensity of radio waves emitted from the plurality of information processing apparatuses and the neighborhood thereof and received by the portable terminal via wireless communication only when the radio waves is detected on or above a predetermined intensity value; and a list presenting unit configured to present a list of one or more detected information processing apparatuses to allow a user to select one of the listed information processing apparatuses.

(2) The control system for an information processing apparatus using a portable terminal of (1), wherein the list presenting unit is configured to present a list of one or more detected information processing apparatuses in the descending order of the radio waves intensity.

(3) The control system for an information processing apparatus using a portable terminal of (1) or (2) further comprising a processing execution control unit of the portable terminal configured to instruct the selected information processing apparatus to execute the processing via wireless communication, the information processing apparatus being selected by a user from the presented list.

(4) The control system for an information processing apparatus using a portable terminal of (3), wherein the wireless communication used to detect the closest information processing apparatus is different from the wireless communication used to instruct the information processing apparatus to execute the processing.

It is to be understood that the invention is not limited to the disclosed embodiments, but intended to cover various modifications and equivalent arrangements within the spirit and scope of the appended claims.

What is claimed is:

1. A control system for an information processing apparatus using a portable terminal comprising a plurality of information processing apparatuses capable of wireless communication and a plurality of portable terminals capable of wireless communication, the control system being configured to execute a processing by one of the plurality of information processing apparatuses selected by the portable terminal, comprising:
the plurality of information processing apparatuses each comprising a radio waves emitting unit which uses first wireless communication means to emit radio waves; and
the plurality of portable terminals each comprising:
a radio waves receiving unit which uses the first wireless communication means to receive the emitted radio waves;
a distance detecting unit which detects the information processing apparatus at the shortest distance from the portable terminal based on the intensity of the radio waves received by the radio waves receiving unit; and
a processing execution control unit which uses second wireless communication means to instruct the detected information processing apparatus to execute the processing,
wherein the first wireless communication means comprises Bluetooth low energy wireless communication means.

2. The control system for an information processing apparatus using a portable terminal of claim 1, wherein the processing execution control unit comprises:
a data generating unit which generates data necessary to execute the processing in response to a user operation requesting execution of the processing;
a destination designating unit which designates the detected information processing apparatus as the destination of the generated data; and
a data transmitting unit which transmits the generated data to the designated information processing apparatus by using the second wireless communication means to instruct the designated information processing apparatus to execute the processing.

3. The control system for an information processing apparatus using a portable terminal of claim 2, wherein the distance detecting unit detects the information processing apparatus at the shortest distance from the portable terminal only when the intensity of the radio waves emitted from the information processing apparatus is on or above a predetermined threshold and the strongest among the plurality of information processing apparatuses.

4. The control system for an information processing apparatus using a portable terminal of claim 3 further comprising a data retaining unit which retains the generated data until the radio waves on or above the predetermined intensity threshold is detected by the distance detecting unit; wherein
the distance detecting unit detects the information processing apparatus emitting the radio waves of the strongest intensity when the radio waves on or above the predetermined intensity threshold is detected;
the destination designating unit designates the detected information processing apparatus as the destination of the generated data when the radio waves on or above the predetermined intensity threshold is detected; and
the data transmitting unit transmits the retained data to the designated information processing apparatus to instruct the designating information processing apparatus to execute the processing.

5. A control system for an information processing apparatus using a portable terminal comprising a plurality of information processing apparatuses capable of wireless communication and a plurality of portable terminals capable of wireless communication, the control system being configured to execute a processing by one of the plurality of information processing apparatuses selected by the portable terminal, comprising:
the control system further comprising a radio waves emitting unit provided near each of the information processing apparatuses, the radio waves emitting unit using first wireless communication means to emit radio raves; and
the plurality of portable terminals each comprising:
a radio waves receiving unit which uses the first wireless communication means to receive the emitted radio waves;
a distance detecting unit which detects the information processing apparatus at the shortest distance from the portable terminal based on the intensity of the radio waves received by the radio waves receiving unit; and
a processing execution control unit which uses second wireless communication means to instruct the detected information processing apparatus to execute the processing,
wherein the distance detecting unit of the portable terminal comprises:
a current position calculating unit which calculates the current position of the portable terminal based on previously stored locational information of the radio waves emitting unit and the intensity of the radio waves received by the radio waves receiving unit; and
a distance calculating unit which calculates the distance of each of the plurality of information processing apparatuses from the portable terminal based on the calculated current position of the portable terminal and previously stored locational information of each of the plurality of information processing apparatuses.

6. The control system for an information processing apparatus using a portable terminal of claim 5, wherein the processing execution control unit comprises:
a data generating unit to generate data necessary to execute the processing in response to a user operation requesting execution of the processing;
a destination designating unit which designates the detected information processing apparatus as the destination of the generated data; and
a data transmitting unit which transmits the generated data to the designated information processing apparatus by using the second wireless communication means to instruct the designated information processing apparatus to execute the processing.

7. The control system for an information processing apparatus using a portable terminal of claim 6, wherein the distance detecting unit detects the information processing apparatus at the shortest distance from the portable terminal when the calculated distance is on or below a predetermined threshold and the shortest among the plurality of information processing apparatuses.

8. The control system for an information processing apparatus using a portable terminal of claim 7 further comprising a data retaining unit which retains the generated data until the information processing apparatus on or below the predetermined distance threshold is detected; wherein
the distance detecting unit detects the information processing apparatus at the shortest distance from the portable terminal when the information processing apparatus on or below the predetermined distance threshold is detected;

the destination designating unit designates the detected information processing apparatus as the destination of the generated data when the information processing apparatus on or below the predetermined distance threshold is detected; and the data transmitting unit transmits the retained data to the designated information processing apparatus to instruct the designating information processing apparatus to execute the processing.

9. A control system for an information processing apparatus using a portable terminal comprising a plurality of information processing apparatuses capable of wireless communication and a plurality of portable terminals capable of wireless communication, the control system being configured to execute a processing by one of the plurality of information processing apparatuses selected by the portable terminal, comprising:

the plurality of portable terminals each comprising:

a distance detecting unit which detects a predetermined number of the information processing apparatuses in ascending order of distance from the portable terminal based on the intensity of radio waves emitted from each of the plurality of information processing apparatuses or the neighborhood thereof and received by the portable terminal by using first wireless communication means;

a list presenting unit which presents a list of the detected information processing apparatuses to allow a user to select one of the listed information processing apparatuses; and a processing execution control unit which instructs the selected information processing apparatus to execute the processing by using the second wireless communication means.

10. A control system for an information processing apparatus using a portable terminal comprising a plurality of information processing apparatuses capable of wireless communication and a plurality of portable terminals capable of wireless communication, the control system being configured to execute a processing by one of the plurality of information processing apparatuses selected by the portable terminal, comprising:

the plurality of information processing apparatuses each being connected to an external device provided with a radio waves emitting unit which uses first wireless communication means to emit radio waves; and the plurality of portable terminals each comprising:

a radio waves receiving unit which uses the first wireless communication means to receive the emitted radio waves;

an association information generating unit which stores association information in an association information storage unit, the association information being generated by associating identification information of the external device with identification information of the information processing apparatus to which the external device is connected;

a distance detecting unit which detects the external device at the shortest distance from the portable terminal based on the intensity of the radio waves received by the radio waves receiving unit and further detects the information processing apparatus connected to the detected external device based on the association information stored in the association information storage unit; and a processing execution control unit which uses second wireless communication means to instruct the detected information processing apparatus to execute the processing.

* * * * *